(12) United States Patent  
Dohi et al.

(10) Patent No.: US 8,825,321 B2  
(45) Date of Patent: Sep. 2, 2014

(54) AUTOMATIC TRANSMISSION CONTROL APPARATUS

(75) Inventors: Koji Dohi, Machida (JP); Minari Ishii, Fujisawa (JP)

(73) Assignees: JATCO Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 576 days.

(21) Appl. No.: 12/841,519

(22) Filed: Jul. 22, 2010

(65) Prior Publication Data

US 2011/0054747 A1    Mar. 3, 2011

(30) Foreign Application Priority Data

Aug. 25, 2009  (JP) ................. 2009-194034

(51) Int. Cl.
*F16H 61/664*    (2006.01)
*F16H 61/04*    (2006.01)
*B60W 10/02*    (2006.01)
*B60W 10/04*    (2006.01)
*B60W 10/10*    (2012.01)

(52) U.S. Cl.
USPC ............................................. 701/55; 477/86

(58) Field of Classification Search
USPC .......................................................... 701/55
See application file for complete search history.

(56) References Cited

U.S. PATENT DOCUMENTS

| 7,645,210 B2 * | 1/2010 | Nakajima et al. ............. 477/107 |
| 2005/0021208 A1 | 1/2005 | Nagai et al. |
| 2008/0220937 A1 * | 9/2008 | Nozaki et al. .................... 477/86 |

FOREIGN PATENT DOCUMENTS

| EP | 0 736 707 A2 | 10/1996 |
| JP | 5-322027 A | 12/1993 |
| WO | WO 2009/038213 A1 | 3/2009 |

* cited by examiner

*Primary Examiner* — Hiep V Nguyen
(74) *Attorney, Agent, or Firm* — Foley & Lardner LLP

(57) ABSTRACT

An automatic transmission control apparatus includes: a frictional engagement element; a hydraulic pressure supplying section configured to supply a hydraulic pressure to the frictional engagement element; a progression state judging section configured to judge a progression state of the engagement of the frictional engagement element; a rotational speed change rate control section configured to control the hydraulic pressure so that a change rate of a rotational speed of an input shaft of the automatic transmission becomes equal to a target change rate, from when the engagement of the frictional engagement element is started; and a rotational speed feedback control section configured to perform a feedback control of the hydraulic pressure so that the rotational speed of the input shaft of the automatic transmission becomes equal to a target rotational speed, from when the progression state judging section judges a predetermined progression state.

20 Claims, 4 Drawing Sheets

AUTOMATIC TRANSMISSION CONTROL APPARATUS

BACKGROUND OF THE INVENTION

This invention relates to an automatic transmission control apparatus.

Japanese Patent Application Publication No. 5-322027 discloses a control apparatus for an automatic transmission which is configured to perform a feedback control of a hydraulic pressure to a corresponding frictional engagement element so that a rotation change rate of an input shaft of the automatic transmission becomes equal to a target change rate when a select lever to select an activation state of the automatic transmission is shifted from a neutral range at which the frictional engagement elements are disengaged, to a running range such as a drive range or a reverse range at which the frictional engagement elements are engaged.

SUMMARY OF THE INVENTION

However, in the above-described automatic transmission, the feedback control is performed by employing the rotation change rate of the input shaft as a target value. Accordingly, a full engagement of the frictional engagement element is not secured. That is, in a case in which the variation of the hydraulic pressure and so on is generated, the rotational speed of the input shaft may not become equal to a synchronous rotational speed after a target shift time period elapsed, even when the feedback control of the rotational speed change rate of the input shaft is performed to attain the target value (on target). The frictional engagement element may not be engaged to attain the target engagement (on target).

It is, therefore, an object of the present invention to provide an automatic transmission control apparatus devised to solve the above-mentioned problems, and to secure an engagement of the frictional engagement element.

According to one aspect of the present invention, an automatic transmission control apparatus comprises: a frictional engagement element arranged to engage in a running state when the automatic transmission is shifted from a neutral state to the running state; a hydraulic pressure supplying section configured to supply a hydraulic pressure to the frictional engagement element; a progression state judging section configured to judge a progression state of the engagement of the frictional engagement element; a rotational speed change rate control section configured to control the hydraulic pressure so that a change rate of a rotational speed of an input shaft of the automatic transmission becomes equal to a target change rate, from when the engagement of the frictional engagement element is started; and a rotational speed feedback control section configured to perform a feedback control of the hydraulic pressure so that the rotational speed of the input shaft of the automatic transmission becomes equal to a target rotational speed, from when the progression state judging section judges a predetermined progression state.

DETAILED DESCRIPTION OF THE INVENTION

Figure 1:
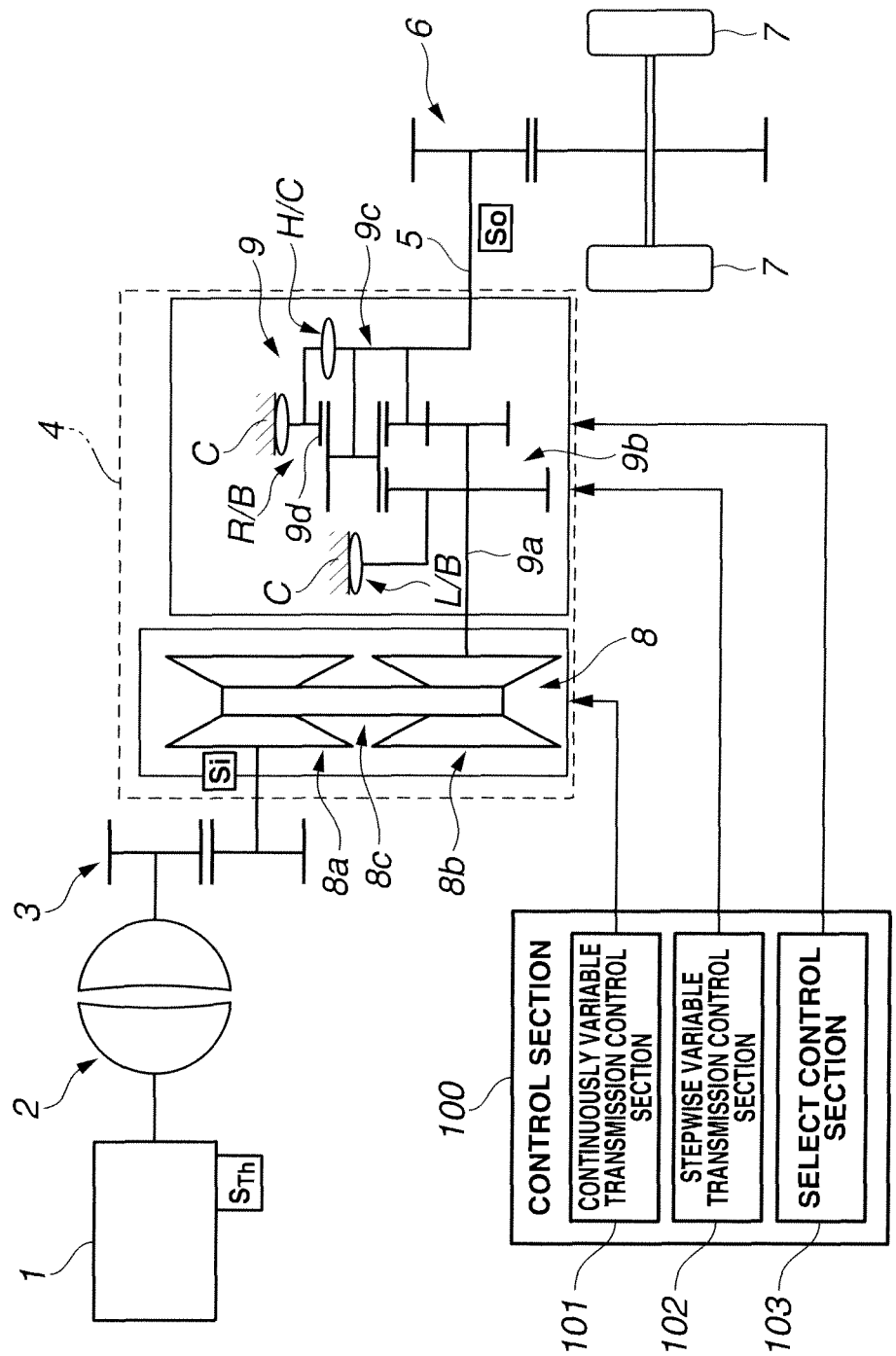
FIG. 1 is a schematic diagram showing a power train according to a first embodiment of the present invention.

FIG. 1 is a schematic view showing a power train equipped with a control apparatus for an automatic transmission according to a first embodiment of the present invention. The power train includes an engine 1 which is a driving source; a torque converter 2 drivingly connected with engine 1; a reduction mechanism 3; an automatic transmission 4 which is drivingly connected through reduction mechanism 3 to torque converter 2, and which has a transmission output shaft (propeller shaft) 5; a final drive gear mechanism 6 drivingly connected through transmission output shaft 5 to automatic transmission 4; and wheels 7 to which a power from automatic transmission 4 is outputted through final drive gear mechanism 6. Automatic transmission 4 includes a continuously variable transmission mechanism 8 and an auxiliary transmission mechanism 9.

Continuously variable transmission mechanism 8 is a well-known belt-type continuously variable transmission mechanism including a driving pulley 8a connected to an output shaft of reduction mechanism 3, a driven pulley 8b connected to an input shaft of auxiliary transmission mechanism 9, and a belt 8c wound around driving pulley 8a and driven pulley 8b. Driving pulley 8a and driven pulley 8b are supplied, respectively, with a hydraulic fluid, and arranged to vary pulley widths in accordance with hydraulic pressures of the hydraulic fluid. With this, continuously variable transmission mechanism 8 makes it possible to vary a transmission ratio or transmission gear ratio in a stepless manner by controlling the supply pressure to driving pulley 8a and the supply pressure to driven pulley 8b.

Auxiliary transmission mechanism 9 is a stepwise variable transmission mechanism or step geared transmission mechanism including a compound sun gear 9b, a career 9c, and a ring gear 9d of Ravigneaux type planetary gear train mechanism. Sun gear 9b is drivingly connected to driven pulley 8b. Sun gear 9b serves as an input. Carrier 9c is drivingly connected to transmission output shaft 5. Carrier 9c serves as an output. Sun gear 9B is fixed through a low brake L/B to a case C. Carrier 9c is drivingly connected through a high clutch H/C to ring gear 9d. Moreover, ring gear 9d is fixed through a reverse brake R/B to case C.

Low brake L/B, high clutch H/C and reverse brake R/B are supplied with the hydraulic fluid, and arranged to freely engage and disengage in accordance with the hydraulic pressures of the hydraulic fluid. With this, auxiliary transmission mechanism 9 makes it possible to select a first forward speed, a second forward speed and a reverse speed by controlling the supply pressures to low brake L/B, high clutch H/C and reverse brake RIB.

In case of selecting the first forward speed, low brake L/B is engaged, and high clutch H/C is disengaged. In case of selecting the second forward speed, low brake L/B is disengaged, and high clutch H/C is engaged. A relationship between the engagements and the disengagements in the control operation of auxiliary transmission mechanism 9 is represented as follow.

|  | L/B | H/C | R/B |
| --- | --- | --- | --- |
| First Speed | ○ | x | x |
| Second Speed | x | ○ | x |
| Reverse | x | x | ○ |

The vehicle according to the first embodiment includes a shift control section 100 provided in a transmission controller 11 (cf. FIG. 2) configured to control the shift of automatic transmission 4. Shift control section 100 includes a continuously variable transmission control section 101 configured to calculate a target input rotational speed of automatic transmission 4, and to control the transmission ratio of continuously variable transmission mechanism 8 in a stepless manner, based on the target input rotational speed; and a stepwise variable transmission control section 102 configured to calculate a target shift stage or target shift range of auxiliary transmission mechanism 9, and to control auxiliary transmission mechanism 9 to this target shift stage. That is, the shift control of continuously variable transmission mechanism 8 and the shift control of auxiliary transmission mechanism 9 are cooperated or coordinated, so that automatic transmission 4 attains the target transmission ratio. Moreover, shift control section 100 includes a select control section 103 configured to smoothly engage the corresponding frictional engagement elements (low brake L/B, reverse brake R/B and so on) when the driver switches (shifts) a select lever (not shown) from a neutral range to a drive range or a reverse range. Select control section 103 is illustrated below.

Figure 2:
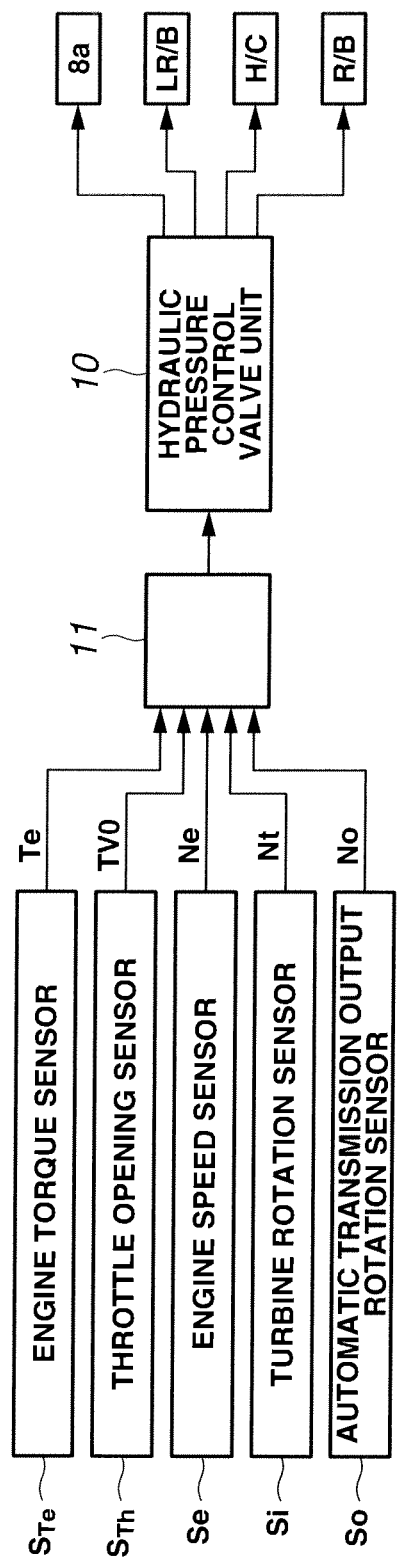
FIG. 2 is a system diagram showing a control system of the power train of FIG. 1.

In continuously variable transmission mechanism 8, the hydraulic pressures supplied to driving pulley 8a and driven pulley 8b (normally, only a hydraulic pressure supplied to driving pulley 8a) are controlled by controlling ON/OFF states of a plurality of solenoid valves equipped in a hydraulic pressure control valve unit 10, as shown in FIG. 2. With this, the transmission ratio can be varied in the stepless manner. Similarly, in auxiliary transmission mechanism 9, the hydraulic pressures supplied to low brake L/B, high clutch H/C and reverse brake R/B are controlled by controlling ON/OFF states of a plurality of solenoid valves equipped in hydraulic pressure control valve unit 10. With this, the first forward speed or the second forward speed is selected.

As shown in FIG. 2, hydraulic pressure control valve unit 10 is controlled by transmission controller 11. Transmission controller 11 receives a signal from an engine torque sensor STe arranged to sense an engine torque Te, a signal from a throttle opening sensor STh arranged to sense a throttle opening TVO, a signal from an engine speed sensor Se arranged to sense an output rotational speed (hereinafter, referred to as engine speed) Ne of engine 1, a signal from a turbine rotation sensor Si arranged to sense an input rotational speed Ni of automatic transmission 4, a signal from an automatic transmission output rotation sensor So arranged to sense a rotational speed (hereinafter, referred to as automatic transmission output shaft rotational speed) No of transmission output shaft 5 and so on. In this case, input rotational speed Ni is sensed as a rotational speed which is decreased by passing from a turbine runner of torque converter 2 through reduction mechanism 3. Accordingly, select control section 103 described later senses, as a turbine rotational speed Nt, a rotational speed that is determined (obtained) by increasing input rotational speed Ni by the amount of the decrease by the reduction mechanism. Similarly, automatic transmission output rotational speed No is a rotational speed which is varied by continuously variable transmission mechanism 8 and auxiliary transmission mechanism 9. Accordingly, when automatic transmission output rotational speed No is compared with turbine rotational speed Nt, automatic transmission output rotational speed No is sensed as an output rotational speed Nout which is converted into the rotational speed before the shift (varying the speed) in view of the transmission ratios of transmission mechanisms 8 and 9.

Figure 3:
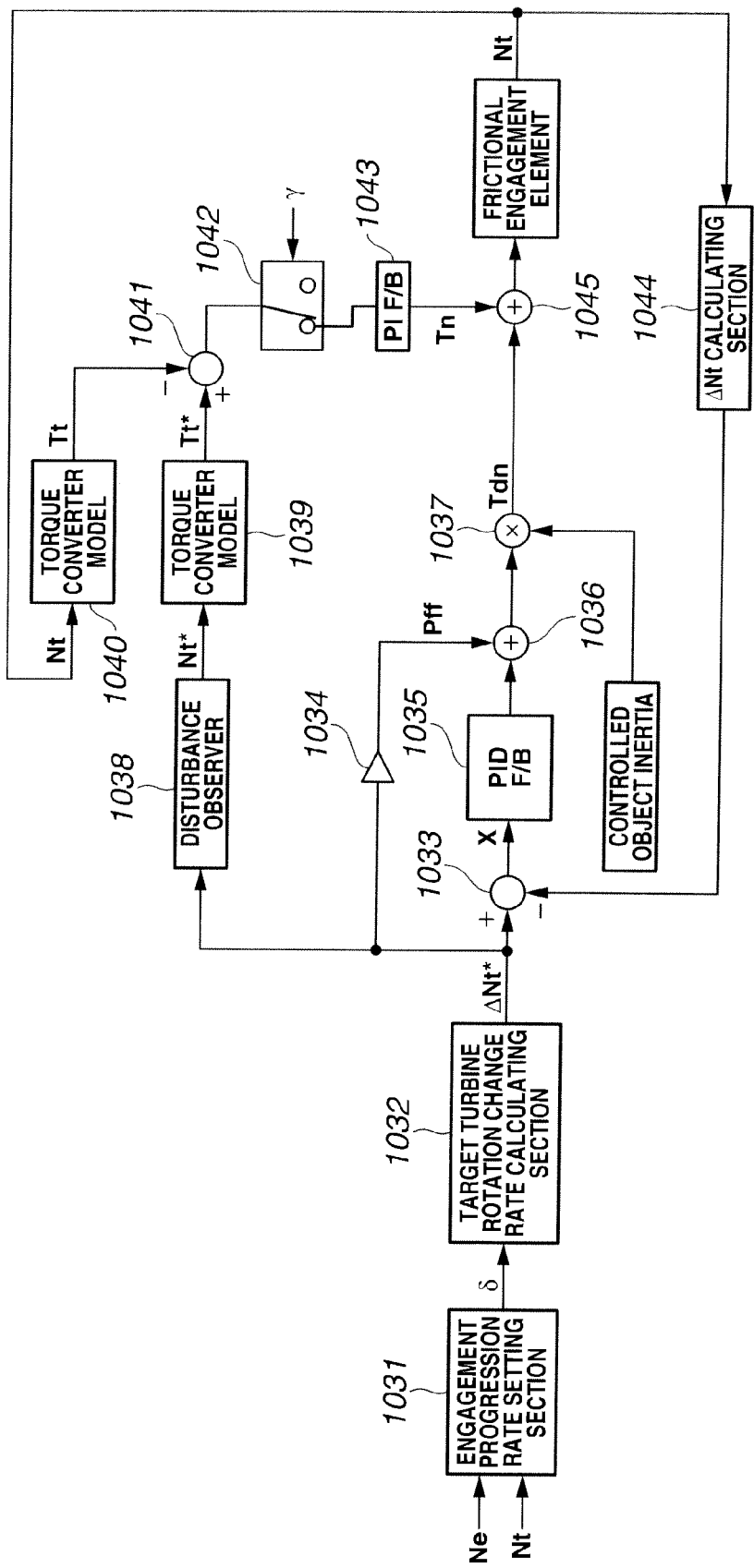
FIG. 3 is a control diagram showing a select control section according to the first embodiment of the present invention.

[Configuration of Select Control Section] Next, select control section 103 is illustrated. FIG. 3 is a control diagram showing a control configuration of select control section 103. An operation of select control section 103 is started when it is judged that the driver switches the select lever from the neutral range to the drive range or the reverse range. Hereinafter, each configuration of select control section 103 is illustrated.

An engagement progression ratio setting section 1031 sets an engagement progression ratio $\delta$ based on engine speed Ne and turbine rotational speed Nt. The engagement progression ratio $\delta$ is defined in the following manner. First, an engagement progression degree $\gamma$ is defined in the following manner.

$$\gamma=\beta/\alpha$$

$$\alpha=Ne-Nout$$

$$\beta=Nt-Nout$$

In this case, engagement progression ratio $\delta$ is defined in the following manner.

$$\delta=1/(d\gamma/dt)$$

That is, engagement progression ratio $\delta$ is an inverse of variation of engagement progression degree $\gamma$ per second. For example, when $\delta=1$ is commanded, the engagement of the frictional engagement element is completed during a second. In this first embodiment, $\delta=1$ is set until engagement progression degree $\gamma$ becomes equal to a predetermined value $\gamma_0$. When engagement progression degree $\gamma$ becomes greater than predetermined value $\gamma_0$, engagement progression rate $\delta$ is set to gradually increase from 1 (for example, engagement progression rate is increased by 0.2 at each control cycle). With this, in a first half of the engagement, the engagement operation is performed in a relatively rapid manner. In a second half (latter half), the engagement operation is performed in a relatively gradual manner. A target turbine rotation change rate calculating section 1032 calculates a target turbine rotation change rate (a target rate of change of the turbine rotational speed) $\Delta Nt^*$ in accordance with the set engagement progression rate $\delta$. That is, an ideal turbine rotation change rate is calculated in accordance with command of the engagement progression rate $\delta$.

(Control Configuration based on Rotation Change Rate) A rotation change rate deviation calculating section 1033 calculates a rotational speed change rate deviation $x(=\Delta Nt^* - \Delta Nt)$ which is a deviation between target turbine rotation change rate (the target rate of change of the turbine rotational speed) $\Delta Nt^*$ and actual turbine rotation change rate (an actual rate of change of the turbine rotational speed) $\Delta Nt$ calculated at an actual turbine rotation change rate calculating section 1044. A change rate feed forward controlled variable calculating section 1034 calculates a feed forward controlled variable P1ff by multiplying target turbine rotation change rate $\Delta Nt^*$ by a predetermined gain. A change rate feedback controlled variable calculating section 1035 calculates a PID controlled variable P1fb based on rotational speed change rate deviation x. For example, PID controlled variable P1fb is calculated in the following manner.

$$P1fb = k1p \cdot x + k1i \cdot \int x dt + k1d \cdot (dx/dt)$$

where k1p, k1i and k1d are, respectively, a proportional gain, an integral gain and a differential gain for the change rate feedback control. A change rate feed forward feedback adding section 1036 adds change rate feed forward controlled variable P1ff and change rate feedback controlled variable P1fb. A torque calculating section 1037 calculates a rotation-change-rate-based torque controlled variable (torque controlled variable based on the rotation change rate) Tdn by multiplying the summation of change rate feed forward controlled variable P1ff and change rate feedback controlled variable P1fb by an inertia of the selected frictional engagement element (low brake L/B, reverse brake R/B and so on) which is the controlled object. This inertia is arbitrarily selected in accordance with the operation of the select lever.

(Control Configuration based on Rotational Speed) A disturbance observer 1038 calculates a target turbine rotational speed Nt* based on target turbine rotation change rate ΔNt*. A first torque converter model 1039 calculates a rotational-speed-based target torque (target torque based on the rotational speed) Tt* by using the calculated target turbine rotational speed Nt*, engine speed Ne and predetermined torque converter specifications. A second torque converter model 1040 calculates a rotational-speed-based actual torque (actual torque based on the rotational speed) Tt by using the sensed actual turbine rotational speed Nt, engine speed Ne and the predetermined torque converter specifications. A rotational speed deviation calculating section 1041 calculates a rotational speed deviation y (=Tt*−Tt) which is a deviation between rotational-speed-based target torque Tt* and rotational-speed-based actual torque Tt. In this case, the first torque converter model 1039 and the second torque converter model 1040 perform the same calculating operation.

A switching section 1042 is configured to receive engagement progression degree γ, to switch to the ON state when engagement progression degree γ reaches predetermined value $γ_0$ representing a predetermined progression state, and to switch to the OFF state when engagement progression degree γ does not reach predetermined value $γ_0$.

A rotational speed feedback controlled variable calculating section 1043 is configured to calculate a PI controlled variable P2fb based on rotational speed deviation y when switching section 1042 is in the ON state and rotational speed deviation y is inputted, and to calculate a rotational-speed-based torque controlled variable (torque controlled variable based on the rotational speed) Tn by multiplying PI controlled variable P2fb by a predetermined gain. For example, PI controlled variable P2fb is calculated in the following manner.

$$P2fb = k2p \cdot y + k2i \cdot \int y \, dt$$

where k2p and k2i are, respectively, a proportional gain and an integral gain for the rotational speed feedback control. When switching section 1042 is in the OFF state, the calculation in this rotational speed feedback controlled variable calculating section 1043 is not performed. When switching section 1043 becomes the ON state, the calculation in this rotational speed feedback controlled variable calculating section 1043 is performed. Accordingly, the integral component in the first half of the engagement is not stored (accumulated).

Controlled variable adding section 1045 adds rotation-change-rate-based torque controlled variable Tdn and rotational-speed-based torque controlled variable Tn, and outputs final hydraulic pressure commands supplied to the frictional engagement elements. In particular, controlled variable adding section 1045 outputs ON/OFF control signals according to the hydraulic pressure commands, to the plurality of the solenoid valves equipped in hydraulic pressure control valve unit 10.

Figure 4:
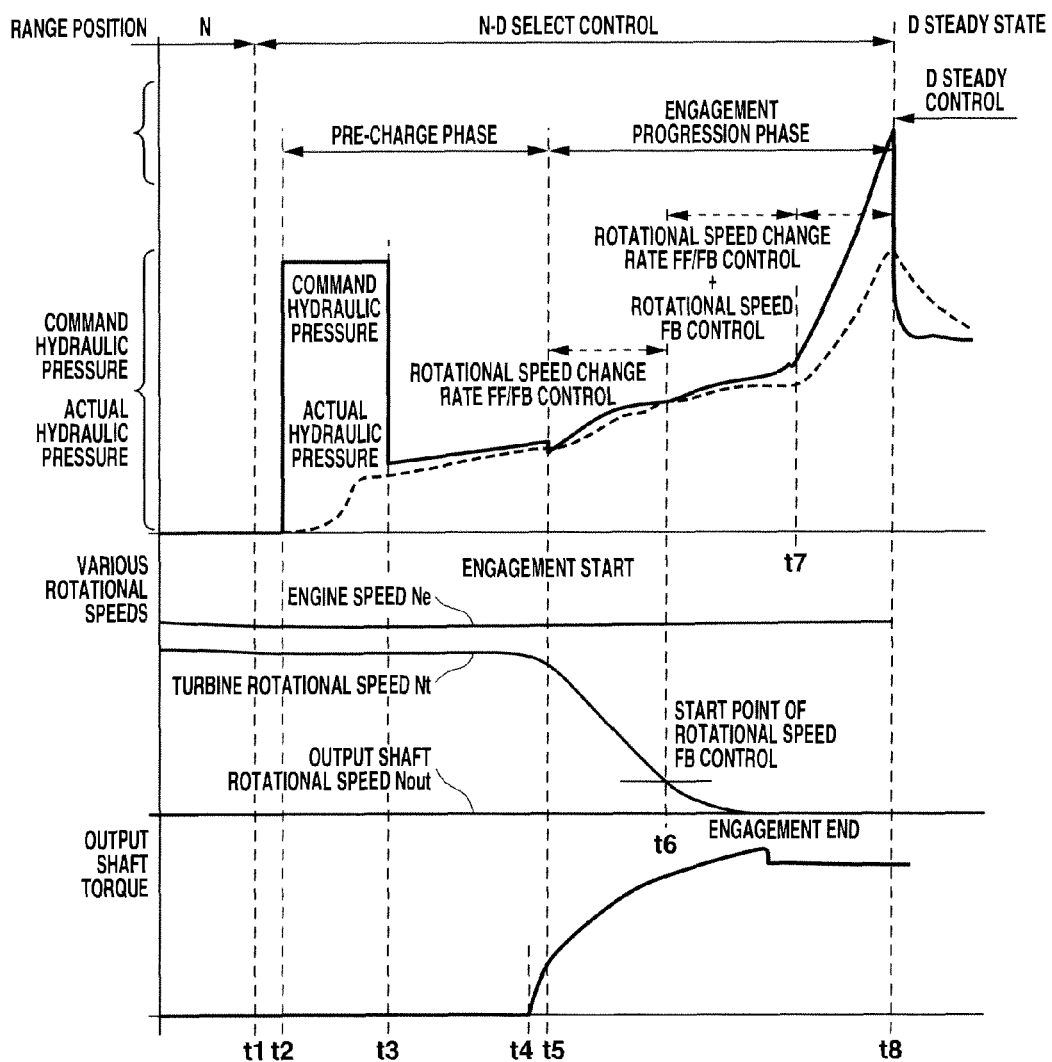
FIG. 4 is a time chart showing an operation of the select control according to the first embodiment of the present invention.

[Engagement Operation by Select Control] Next, an operation of the select control section is illustrated. FIG. 4 is a time chart showing a relationship between a hydraulic pressure variation (change) and each rotational speed when the driver shifts from the neutral range (N range) to the drive range (D range). In an initial state, the neutral range is selected. All of the frictional engagement elements such as low brake L/B are fully disengaged.

At time t1, the driver operates the select lever to shift to the D range. At time t2, a pre-charge phase starts. A rapid pressure increasing command for the pre-charge which is for rapidly increasing the pressure is outputted to low brake L/B. This operation is for rapidly stroking (moving) the piston to close clearances between the clutch plates. Accordingly, the engagement force is not generated. The only actual pressure substantially identical to the return spring force is generated. The piston stroke speed is ensured by outputting a high pressure command in the initial stage. At time t3, the rapid pressure increasing command for the pre-charge during a predetermined time period is finished, and a gradual pressure increasing command for the pre-charge which is for gradually increasing the pressure is outputted. The gradual pressure increasing command is for adjusting a piston stroke speed appropriately, and for absorbing the impact at the engagement.

At time t4, the engagement pressure of low brake L/B is started to gradually ensured. Turbine rotational speed Nt is gradually decreased. The output shaft torque is started to be outputted. At time t5, when the decrease of turbine rotational speed Nt is sensed, the pre-charge phase is finished, and an engagement progression phase is started. The rotation change rate control (the change rate feed forward control and the change rate feedback control) is performed. In this stage, engagement progression degree γ does not reach predetermined value $γ_0$. Accordingly, only the rotation change rate control is performed, and the rotational speed feedback control is not performed. Therefore, in the initial stage of the engagement in which the deviation between turbine rotational speed Nt and output rotational speed Nout is large, the integral component is not accumulated by the feedback control. Therefore, it is possible to prevent the excessive overshoot of the controlled variable at the completion of the engagement.

At time t6, when engagement progression degree γ reaches predetermined value $γ_0$, switching section 1042 is switched to the ON state. The feedback control based on the rotational speed (the rotational-speed-based feedback control) is started. With this, the full engagement state at the completion of the engagement is secured. Moreover, it is possible to attain the smooth engagement. If the rotational speed feedback control is not performed (employed) and the control operation is performed by increasing the control gains of the rotation change rate feed forward control and the rotation change rate feedback control, the control system may be diverted when the gain is excessively increased. The deviation of the rotational speeds may not be dissolved only by considering the change rate. Accordingly, it is extremely effective to employ (add) the control based on the rotational speed (the rotational-speed-based control) to attain the smooth full engagement in the stable control system.

At time t7, the engagement is finished. The command pressure is rapidly increased to shift to the full engagement state. At time t8, the hydraulic pressure is once increased to the full engagement hydraulic pressure. Then, a steady (normal) control of the drive range is started. This steady control is for improving the fuel economy while the necessary engagement force is ensured by supplying the engagement pressure in accordance with the accelerator opening and so on. The low engagement pressure is supplied when the accelerator opening is small. The high engagement pressure is supplied when the accelerator opening is large.

An automatic transmission control apparatus includes low brake L/B and reverse brake R/B (frictional engagement element) arranged to engage in a running state when the automatic transmission is shifted from the neutral range (neutral state) to the drive range or the reverse range (running state); hydraulic pressure control valve unit 10 (hydraulic pressure supplying section) arranged to supply the hydraulic pressure to the frictional engagement element; engagement progression rate setting section 1031 and switching section 1042 (progression state judging section) configured to judge the progression state of the engagement of the frictional engagement element; rotation change rate deviation calculating section 1033, change rate feed forward controlled variable calculating section 1034, change rate feedback controlled variable calculating section 1035, change rate feed forward feedback adding section 1036 and torque calculating section 1037 (rotational speed change rate controlling section) configured to control the hydraulic pressure so that the change rate of the rotational speed of the input shaft of the automatic transmission becomes equal to the target change rate from when the engagement of the frictional engagement element is started; rotational speed feedback controlled variable calculating section 1043 (rotational speed feedback control section) configured to perform the feedback control of the hydraulic pressure so that the rotational speed of the input shaft of the automatic transmission becomes equal to the target rotational speed from when switching section 1042 judges the predetermined progression state $\gamma_0$.

Accordingly, it is possible to secure the engagement of the frictional engagement element. The rotational speed feedback control is not performed until the progression state of the engagement becomes the predetermined progression state. The rotational speed feedback control is performed after the predetermined progression state. With this, it is possible to suppress the accumulation of the integral component of the deviation by the variation, and to prevent the excessive increase of the controlled variable.

In the automatic transmission control apparatus according to the embodiment of the present invention, the target change rate and the target rotational speed are set so that the engagement of the frictional engagement element in a second half (latter half) gradually progresses relative to the engagement of the frictional engagement element in a first half.

In particular, $\delta=1$ is set until engagement progression degree $\gamma$ becomes equal to the predetermined value $\gamma_0$. When engagement progression degree $\gamma$ exceeds predetermined value $\gamma_0$, engagement progression ratio $\delta$ is set to gradually increase from 1 (for example, engagement progression rate $\delta$ increases by 0.2 at each control cycle). With this, it is possible to perform the relatively rapid engagement operation in the first half, and to perform the relatively gradual engagement operation in the second half. It is possible to engage the frictional engagement element to attain the target engagement (on target) while the engagement shock is suppressed.

Although the invention has been described above by reference to the first embodiment of the invention, the invention is not limited to the embodiment described above. The automatic transmission control apparatus according to the present invention can employ modifications and variations of the embodiment described above. The control operation according to the first embodiment employs engagement progression degree and engagement progression rate as the parameters to judge the progression state of the engagement. For example, the control operation may be performed based on the input shaft rotational speed or the difference of the rotational speeds of the frictional engagement elements which is capable of judging the progression state of the engagement.

Moreover, in the first embodiment, the automatic transmission is constituted by the continuously variable transmission and the auxiliary transmission. The present invention is not limited to this automatic transmission. The automatic transmission may be constituted only by the continuously variable transmission. Moreover, the automatic transmission may be constituted only by the stepwise variable transmission.

Furthermore, in the first embodiment, the control operation is applied to the engagements of low brake L/B and reverse brake R/B. For example, the control operation is applicable to the engagement of high clutch H/C when the control operation is performed through a high shift stage so as to avoid the shock.

Moreover, in the rotational speed feedback control of the first embodiment, the feedback controlled variable is determined by the deviation of the torques based on the rotational speeds. However, the controlled variable may be determined by the deviation of the rotational speeds, and then converted to the torque controlled variable by multiplying by a predetermined gain. In the control operation based on the rotation change rate, the combination of the feed forward control and the feedback control is shown. However, the control operation may be performed by one of the feed forward control and the feedback control. Furthermore, in the rotational speed feedback control, the PI control is employed. However, the PID control may be employed as necessary.

The entire contents of Japanese Patent Application No. 2009-194034 filed Aug. 25, 2009 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission control apparatus comprising:
    a frictional engagement element arranged to engage in a running state when the automatic transmission is shifted from a neutral state to the running state;
    a hydraulic pressure supplying section configured to supply a hydraulic pressure to the frictional engagement element;
    a progression state judging section configured to judge a progression state of the engagement of the frictional engagement element, the progression state based on an equation including turbine rotational speed and engine output rotational speed;
    a rotational speed change rate control section configured to control the hydraulic pressure so that a change rate of a rotational speed of an input shaft of the automatic transmission becomes equal to a target change rate, from when the engagement of the frictional engagement element is started; and
    a rotational speed feedback control section configured to perform a feedback control of the hydraulic pressure so that the rotational speed of the input shaft of the automatic transmission becomes equal to a target rotational speed, from when the progression state judging section judges a predetermined progression state.

2. The control apparatus as claimed in claim 1, wherein the target change rate and the target rotational speed are set so that the engagement of the frictional engagement element in a second half gradually progresses relative to the engagement of the frictional engagement element in a first half.

3. The control apparatus as claimed in claim 1, wherein the target change rate and the target rotational speed are set so that a second half of the engagement of the frictional engagement element progresses more gradually than a first half of the engagement of the frictional engagement element.

4. The control apparatus as claimed in claim 1, wherein the target change rate and the target rotational speed are set so that a first half of the engagement of the frictional engagement element progresses more rapidly than a second half of the engagement of the frictional engagement element.

5. The control apparatus as claimed in claim 1, wherein the equation represents an engagement progression degree.

6. The control apparatus as claimed in claim 5, wherein the progression state is an inverse of a rate of change of the engagement progression degree.

7. An automatic transmission control apparatus comprising:
  a frictional engagement element arranged to engage in a running state when the automatic transmission is shifted from a neutral state to the running state;
  a hydraulic pressure supplying section configured to supply a hydraulic pressure to the frictional engagement element;
  a progression state judging section configured to judge a progression state of the engagement of the frictional engagement element, the progression state based on turbine rotational speed, engine output rotational speed, and output shaft rotational speed;
  a rotational speed change rate control section configured to control the hydraulic pressure so that a change rate of a rotational speed of an input shaft of the automatic transmission becomes equal to a target change rate, from when the engagement of the frictional engagement element is started; and
  a rotational speed feedback control section configured to perform a feedback control of the hydraulic pressure so that the rotational speed of the input shaft of the automatic transmission becomes equal to a target rotational speed, from when the progression state judging section judges a predetermined progression state.

8. The control apparatus as claimed in claim 7, wherein the target change rate and the target rotational speed are set so that the engagement of the frictional engagement element in a second half gradually progresses relative to the engagement of the frictional engagement element in a first half.

9. The control apparatus as claimed in claim 7, wherein the target change rate and the target rotational speed are set so that a second half of the engagement of the frictional engagement element progresses more gradually than a first half of the engagement of the frictional engagement element.

10. The control apparatus as claimed in claim 7, wherein the target change rate and the target rotational speed are set so that a first half of the engagement of the frictional engagement element progresses more rapidly than a second half of the engagement of the frictional engagement element.

11. The control apparatus as claimed in claim 7, wherein the progression state represents a rate of change of an engagement progression degree.

12. The control apparatus as claimed in claim 11, wherein the engagement progression degree is a ratio defined as a first quantity divided by a second quantity, the first quantity being the turbine rotational speed minus the output shaft rotational speed, and the second quantity being the engine output rotational speed minus the output shaft rotational speed.

13. An automatic transmission control apparatus comprising:
  a frictional engagement element arranged to engage in a running state when the automatic transmission is shifted from a neutral state to the running state;
  a hydraulic pressure supplying section configured to supply a hydraulic pressure to the frictional engagement element;
  a progression state judging section configured to judge a progression state of the engagement of the frictional engagement element, the progression state associated with a ratio in which the numerator of the ratio is related to turbine rotational speed and the denominator of the ratio is related to engine speed;
  a rotational speed change rate control section configured to control the hydraulic pressure so that a change rate of a rotational speed of an input shaft of the automatic transmission becomes equal to a target change rate, from when the engagement of the frictional engagement element is started; and
  a rotational speed feedback control section configured to perform a feedback control of the hydraulic pressure so that the rotational speed of the input shaft of the automatic transmission becomes equal to a target rotational speed, from when the progression state judging section judges a predetermined progression state.

14. The control apparatus as claimed in claim 13, wherein the target change rate and the target rotational speed are set so that the engagement of the frictional engagement element in a second half gradually progresses relative to the engagement of the frictional engagement element in a first half.

15. The control apparatus as claimed in claim 13, wherein the target change rate and the target rotational speed are set so that a second half of the engagement of the frictional engagement element progresses more gradually than a first half of the engagement of the frictional engagement element.

16. The control apparatus as claimed in claim 13, wherein the target change rate and the target rotational speed are set so that a first half of the engagement of the frictional engagement element progresses more rapidly than a second half of the engagement of the frictional engagement element.

17. The control apparatus as claimed in claim 13, wherein the progression state is associated with a rate of change of the ratio.

18. The control apparatus as claimed in claim 17, wherein the numerator is equal to the turbine rotational speed minus an output shaft rotational speed, and the denominator is equal to the engine speed minus the output shaft rotational speed.

19. The control apparatus as claimed in claim 18, wherein the progression state is an inverse of the rate of change of the ratio.

20. The control apparatus as claimed in claim 13, wherein a shift from the neutral state to the running state is a shift from neutral to reverse.

* * * * *